US006940050B2

(12) United States Patent
Probst

(10) Patent No.: US 6,940,050 B2

(45) Date of Patent: Sep. 6, 2005

(54) ELECTRIC HEATING DEVICE COMPRISING A PLURALITY OF HEATING ELEMENTS

(75) Inventor: Frank Probst, Herxheim (DE)

(73) Assignee: Catem GmbH & Co. KG, Herzheim (DE)

(*) Notice: Subject to any disclaimer, the term of this patent is extended or adjusted under 35 U.S.C. 154(b) by 0 days.

(21) Appl. No.: 10/696,724

(22) Filed: Oct. 29, 2003

(65) Prior Publication Data

US 2004/0256377 A1 Dec. 23, 2004

(30) Foreign Application Priority Data

Oct. 30, 2002 (EP) ........................................... 02024503

(51) Int. Cl.[7] ................................................. H05B 1/02

(52) U.S. Cl. ........................ 219/486; 219/492; 219/205

(58) Field of Search ................................ 219/486, 492, 219/205, 208, 483, 508; 307/41

(56) References Cited

U.S. PATENT DOCUMENTS

| | | | | | |
|---|---|---|---|---|---|
| 4,447,712 | A | * | 5/1984 | Covillion | 219/486 |
| 4,559,441 | A | * | 12/1985 | Rudich et al. | 219/486 |
| 4,829,159 | A | * | 5/1989 | Braun et al. | 219/486 |
| 5,866,880 | A | * | 2/1999 | Seitz et al. | 219/483 |
| 2002/0011484 | A1 | * | 1/2002 | Beetz et al. | 219/202 |
| 2004/0099653 | A1 | * | 5/2004 | Hirayama et al. | 219/483 |

FOREIGN PATENT DOCUMENTS

EP 1 157 868 11/2001

* cited by examiner

*Primary Examiner*—Teresa J. Walberg

(74) *Attorney, Agent, or Firm*—Boyle Fredrickson Newholm Stein & Gratz S.C.

(57) ABSTRACT

The invention relates to an electric heating device and a method of controlling such a heating device, by means of which homogeneous heating of a heating register is to be achieved. For this purpose, the allocations between the control channels of a control device and the heating elements are varied at predetermined time intervals.

34 Claims, 6 Drawing Sheets

ELECTRIC HEATING DEVICE COMPRISING A PLURALITY OF HEATING ELEMENTS

BACKGROUND OF THE INVENTION

1. Field of the Invention

The invention relates to an electric heating device used as an auxiliary heating for motor vehicles that includes a plurality of heating elements, which are combined so as to form a heating block. Each of the heating elements is adapted to be controlled separately to heat a particular portion of a total air flow to be heated. A control device controls the heating power of each of the heating elements separately and is configured such that the allocation of the heating power to each of the heating elements is permuted at predetermined time intervals. Such an electric heating device is particularly suitable for use as an auxiliary electric heating in motor vehicles.

This object is achieved by providing a method of controlling an electric heating device comprising the steps of controlling the heating power of each of the heating elements separately and permuting the allocation of a heating power to each of the heating elements a predetermined time intervals.

2. Description of the Related Art

In motor vehicles, electric heating devices are used for heating the air in the passenger cabin, for preheating the coolant in water-cooled engines or for warming up fuel, among other purposes. Such auxiliary electric heatings normally consist of at least one heating stage with heating elements and a control device. The heating elements are normally implemented as a heating resistor, especially as a PTC element. The heating and the control unit may be implemented as separate functional units, but they may also be combined so as to form one structural unit.

EP-A2 1 157 868 describes an electric heating device in which the heating elements as well as a control unit are combined so as to form one structural unit. For controlling the heating elements, a plurality of control concepts is disclosed, which will be summarized briefly hereinbelow.

A power control for an electric heating device comprises, in the simplest case, a plurality of separate heating elements and an identical control of all heating elements. Such a control is shown in FIG. 1 taking three heating stages as an example. The heating powers of the individual heating stages P1, P2 and P3 are shown one below the other, above the total heating power P (in the lowermost diagram). When the heating demand increases, the individual heating elements will be controlled uniformly so that each of the individual heating elements will produce an increasing heating power. The total heating power P corresponds to the sum of the individual heating powers P1 to P3.

For controlling electric loads, the so-called pulse width modulation (PWM) is frequently used. A characteristic feature of said pulse width modulation is that it can be technically realized in a particularly simple manner. FIG. 2 shows such a clocked control. Each heating circuit of the heating device is clocked by a control unit with a fixed frequency F and the period T. The power of each individual heating element results from the clock ratio. By modulating the width of the pulses, it is possible to vary the heating power.

The power control shown in FIG. 2 corresponds, in principle, to the linear control that has been described making reference to FIG. 1. Hence, all the heating elements are controlled uniformly for producing a predetermined total heating power. When the total heating power increases, the heating power of the individual heating elements will increase accordingly. The clock ratio in FIG. 2 is e.g. 70% for each of the pulses. Hence, 70% of the maximum possible heating power is produced. In the lowermost diagram of FIG. 2, the broken line with the designation $P_{70\%}$ indicates the average effective heating power of all heating elements of the heating device, whereas the solid line indicates the respective instantaneous power.

In order to reduce EMC problems in connection with the use of pulse width modulation, the loads are switched on and off "gently", i.e. with a comparatively slow edge. Since the power switches required for this purpose are, however, controlled in linear operation during such an edge, a substantial instantaneous power loss will be produced simultaneously. Such "edge losses" may amount to an essential percentage of the total power loss at the respective switches in the control of electric auxiliary heatings.

A control of the type shown in FIG. 2 is disadvantageous insofar as the heating power produced by the heating elements varies with time. Another problem are the very high current peaks on the supply line, since all the loads are switched on and off simultaneously.

In order to avoid such variations with time during heat transfer, the heating elements of an electric heating can be controlled with a time shift when pulse width modulation is used. One example for this kind of control is shown in FIG. 3. In this example, the three heating elements shown are clocked with a time shift t. The respective active pulse width is distributed over a whole period T of a clock for the individual stages.

In such a process, the n-fold (n=number of channels) frequency component becomes visible in the sum current of the loads, i.e. of the heating elements. This allows a comparatively low pulse width modulation frequency at a uniform sum current frequency.

When such electric heating devices are used in motor vehicles, the sum current frequency influences the whole onboard power supply of the motor vehicle and can be seen as a disturbing light flicker as soon as the visual perception limits are no longer reached.

As has been mentioned hereinbefore, edge losses will always occur when control is effected via a pulse width modulation. These edge losses occur whenever a load is switched on and off so that their percentage will increase linearly with increasing control frequency. However, the control frequency must not fall below certain lower limits either, so as to prevent the light flicker from becoming visible. Hence, only a certain corridor within which the control frequency can be varied remains for an appropriate control frequency.

The magnitude of the edge losses results from the following equation:

$$P_{Edge} = \left[\frac{W_{Rising\ Edge}}{T_{PWM}} + \frac{W_{Falling\ Edge}}{T_{PWM}} \cdot n\right] \quad (1)$$

In this equation, $P_{Edge}$ stands for the power loss caused by the edges, $W_{Rising\ Edge}$ for the energy converted in a power switch during a rising edge, $W_{Falling\ Edge}$ for the energy converted in a power switch during a falling edge, $T_{PWM}$ for the period duration of the pulse width modulation and n for the number of channels, i.e. the number of separately controlled heating elements.

Such edge losses can be reduced markedly by improved control methods. In an improved control method for an electric heating device, the heating power of only one of the heating elements is adapted to be variably adjusted for this purpose. All the other heating elements can only be switched on or off, i.e. they can either be operated under full load or under zero load. These heating elements are switched on and off according to requirements. For a "fine adjustment" of the heating power to be generated, the continuously adjustable heating element with a variable heating power contribution is switched on.

When this concept is combined with pulse width modulation, not all the channels are clocked continuously, but only the heating power of the continuously adjustable channel is adjusted through a pulse width modulation. This type of control is shown in FIG. 4 and FIG. 5. The heating power of a heating element is increased until the heating element has reached the maximum of the heating power that can be produced. Subsequently, the current supply to this heating element is continued without clocking, i.e. without pulse width modulation. If the heating power to be produced is increased still further, said heating power will be produced via a pulse width modulation of the next heating element. This process is continued until all heating elements are switched on continuously. FIG. 5 shows an alternative in the case of which only the heating power of one of the heating elements is continuously adjustable, whereas the other heating elements are only switched on and off.

In this way, the same yielded heating power can be produced with lower edge losses. The edge losses occurring are represented by the following equation:

$$P_{Edge} = \frac{W_{Rising\ Edge}}{T_{PWM}} + \frac{W_{Falling\ Edge}}{T_{PWM}} \qquad (2)$$

Due to the fact that only one of the heating elements is controlled via a pulse width modulation at the same time, the edge losses will be reduced to 1/n in comparison with the preceding equation.

A heating power control of the above-mentioned type is, however, disadvantageous with regard to the inhomogeneous heating of the heating block by the individual heating elements. This has the effect that the medium to be heated will be heated in a locally non-uniform manner and will therefore have zones of different temperature.

OBJECTS AND SUMMARY OF THE INVENTION

It is the object of the present invention to provide an electric heating device in which the heating elements are heated uniformly and the power loss is low, as well as a method of controlling such an electric heating device.

This object is achieved by the feature of claim 1 for an electric heating device and by the features of claim 9 for a control method.

According to the present invention, the allocation of the control signals to the heating elements is varied at predetermined time intervals. For controlling such an electric heating device, the respective currents supplied to the heating elements are exchanged so that the heating elements will be controlled successively by different "control channels" of the control unit. A more homogeneous heating of the medium to be heated can thus be achieved when averaged over time.

According to a preferred embodiment, the allocation is changed by permutation or rotation of all allocations. A homogeneous heating of the medium to be heated can be achieved in this way, since each heating element has successively allocated thereto each "channel" of the device.

Irregularities in the medium to be heated can be avoided in this way, especially when a control scheme is used in which individual heating elements are switched over between maximum heating power and zero power.

When a changeover between maximum heating power and zero power is used for controlling heating elements, at least one control channel whose heating power can be adjusted continuously will be necessary. It will be advantageous to use one continuously adjustable control channel and, as for the rest, channels in the case of which switching over between maximum heating power and zero power is effected. This type of control makes it possible to achieve a lower power loss in combination with a more precise adjustment of the heating power.

In accordance with an advantageous embodiment, pulse width modulation is used for controlling the continuously adjustable heating power. The time intervals at which the allocations are changed are preferably an integer multiple of a period of the pulse width modulation. In this way, edge losses can be kept particularly low in that switching over is effected.

The subject matters of the subclaims are advantageous embodiments of the present invention.

BRIEF DESCRIPTION OF THE DRAWINGS

In the following, the invention will be described making reference to the figures enclosed, in which.

DETAILED DESCRIPTION OF THE PREFERRED EMBODIMENTS

Figure 1:
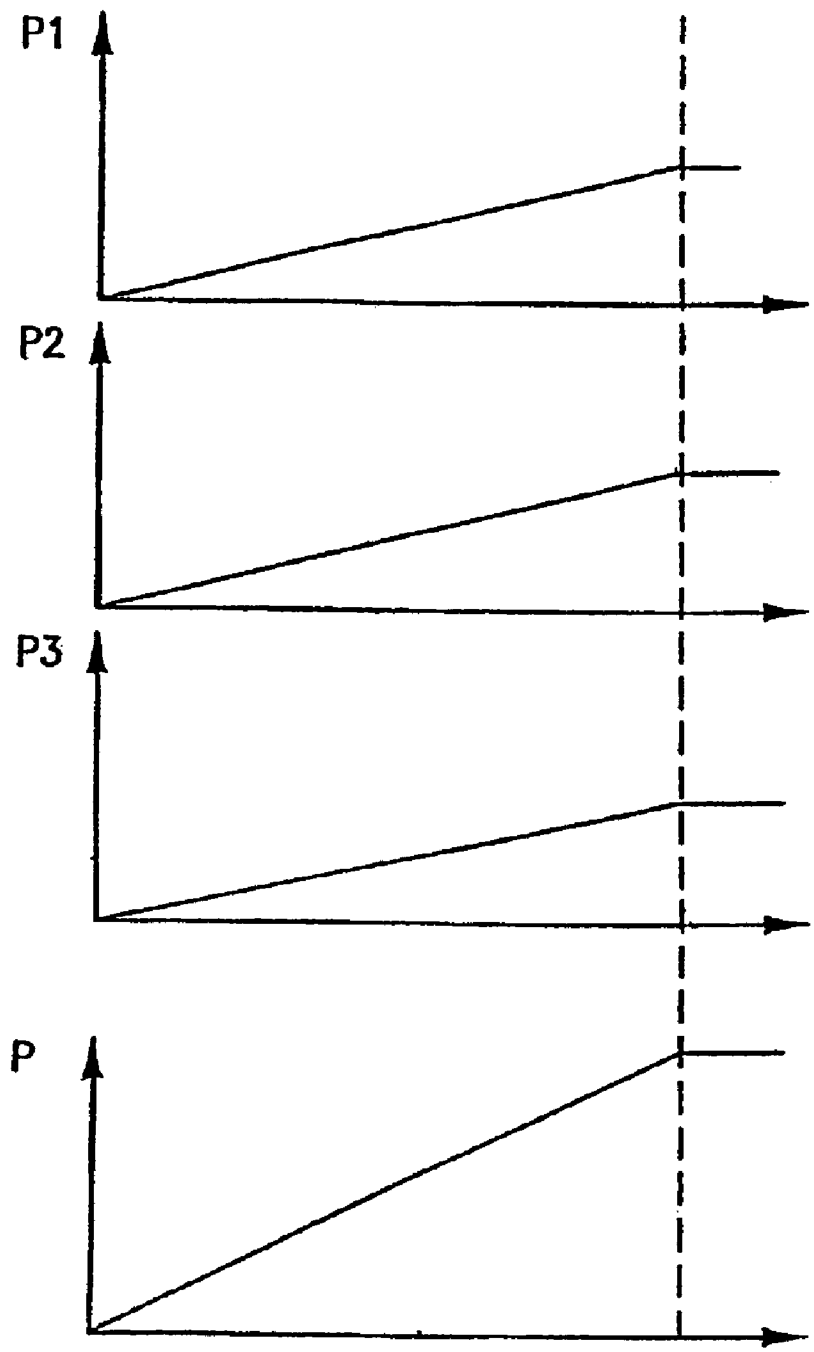
FIG. 1 shows a control concept for uniformly controlling three heating elements.
Figure 3:
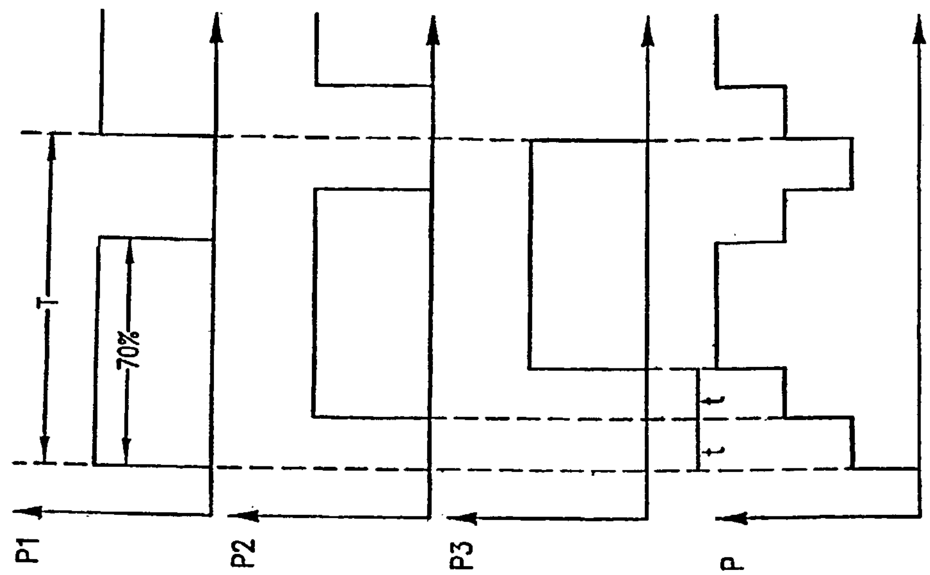
FIG. 3 shows a clocked control of the heating power with time shift of the individual control channels.
Figure 2:
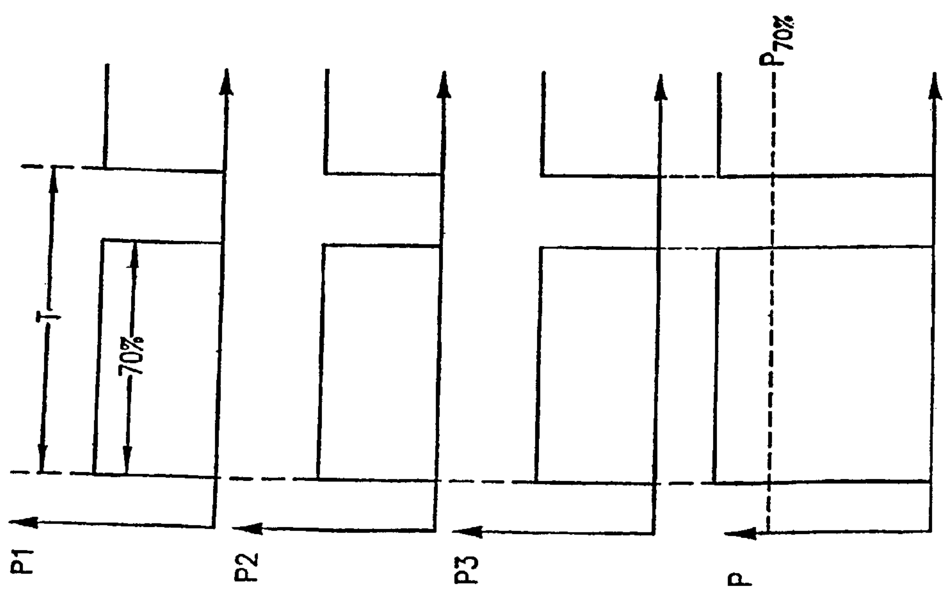
FIG. 2 shows an example of a clocked control of the heating power.
Figure 5:
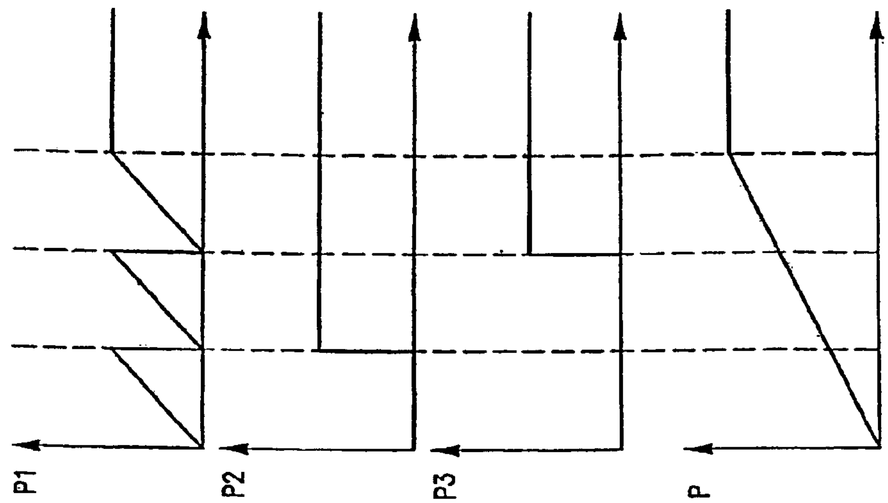
FIGS. 4 and 5 show variants of a control concept according to which always only one heating element at a time is operated between zero load and maximum heating power.
Figure 4:
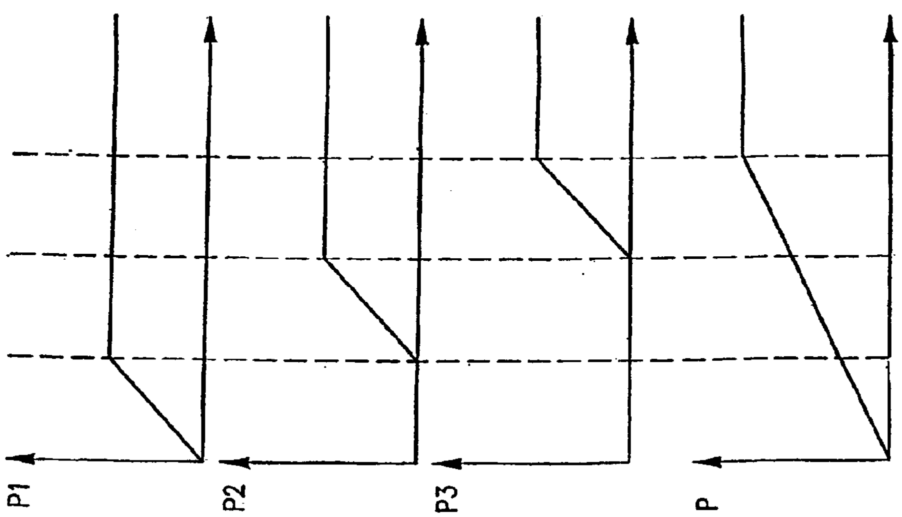
Figure 6A:
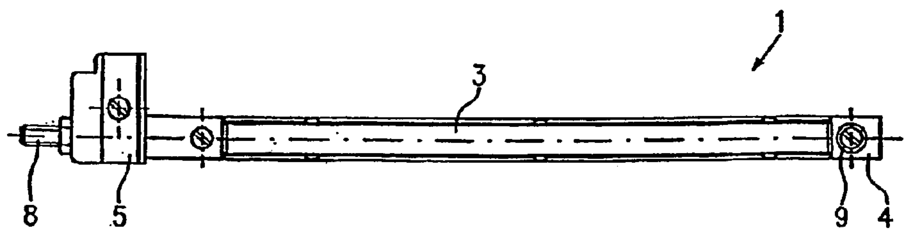
FIGS. 6*a* and 6*b* show a top view and a side vie of an electric heating device according to the present invention.
Figure 6B:
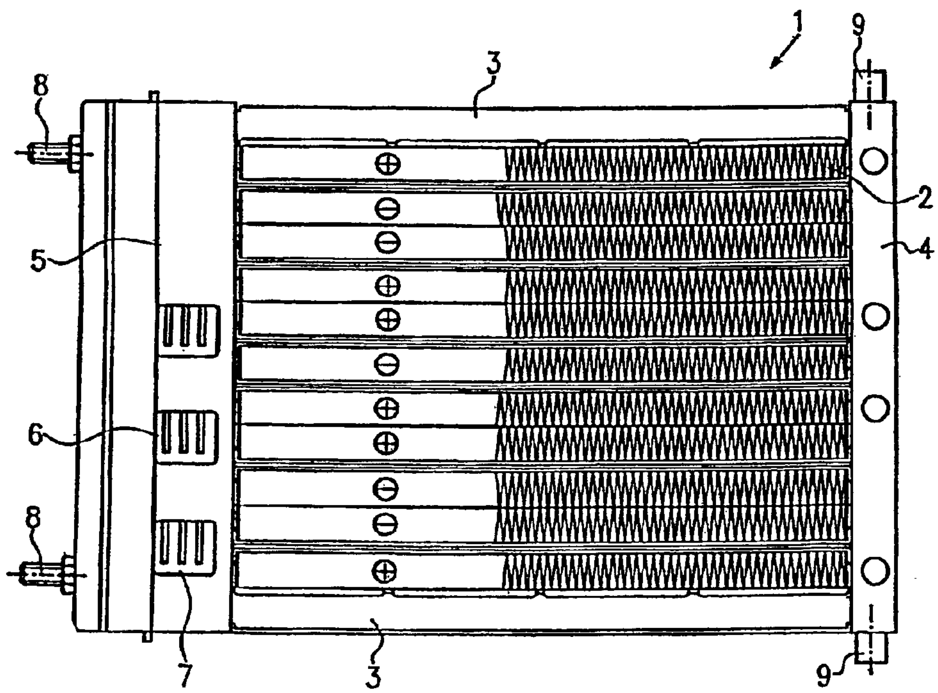

FIG. 6*a* shows a side view of the electric heating device 1 according to the present invention which is suitable especially for use in motor vehicles. FIG. 6*b* shows a top view of the electric heating device 1. The electric heating device 1 includes a heating block comprising a plurality of layered or stacked heating elements 2. Each heating element 2 comprises at least one resistance heating element with radiators or heat conducting surfaces arranged adjacent thereto. The elements used as resistance heating elements are preferably PTC elements. The heating block comprising the heating elements 2 is held in a frame. This frame comprises opposed longitudinal bars 3 and lateral bars 4 and 5 which are arranged at right angles to these longitudinal bars 3. In contrast to the lateral bar 4, the lateral bar 5 is implemented as a box that is open on one side thereof. The opening of this box-shaped lateral bar 5 is located on the side of said lateral bar 5 which faces the heating elements 2. This box is adapted to have inserted therein a control device which controls the heat output of the individual heating elements 2 by controlling the current supplied to the heating elements 2. The open side of the lateral bar 5 implemented as a box is closed by a cover which is attached to or clipped onto said lateral bar 5 after insertion of the control circuit. The electric heating device 1 is supplied with current via two terminal pins 8. These terminal pins 8 are implemented such that the necessary heating currents can easily be conducted by them. According to a special embodiment, the lateral bar 5 has window openings 7 in the sides. These window openings 7 are arranged such that they are also located in the current of the medium to be heated. Cooling elements 6 are arranged between the opposed window openings 7, said cooling elements 6 eliminating the dissipation heat of the power electronics components of the control circuit.

Figure 7:
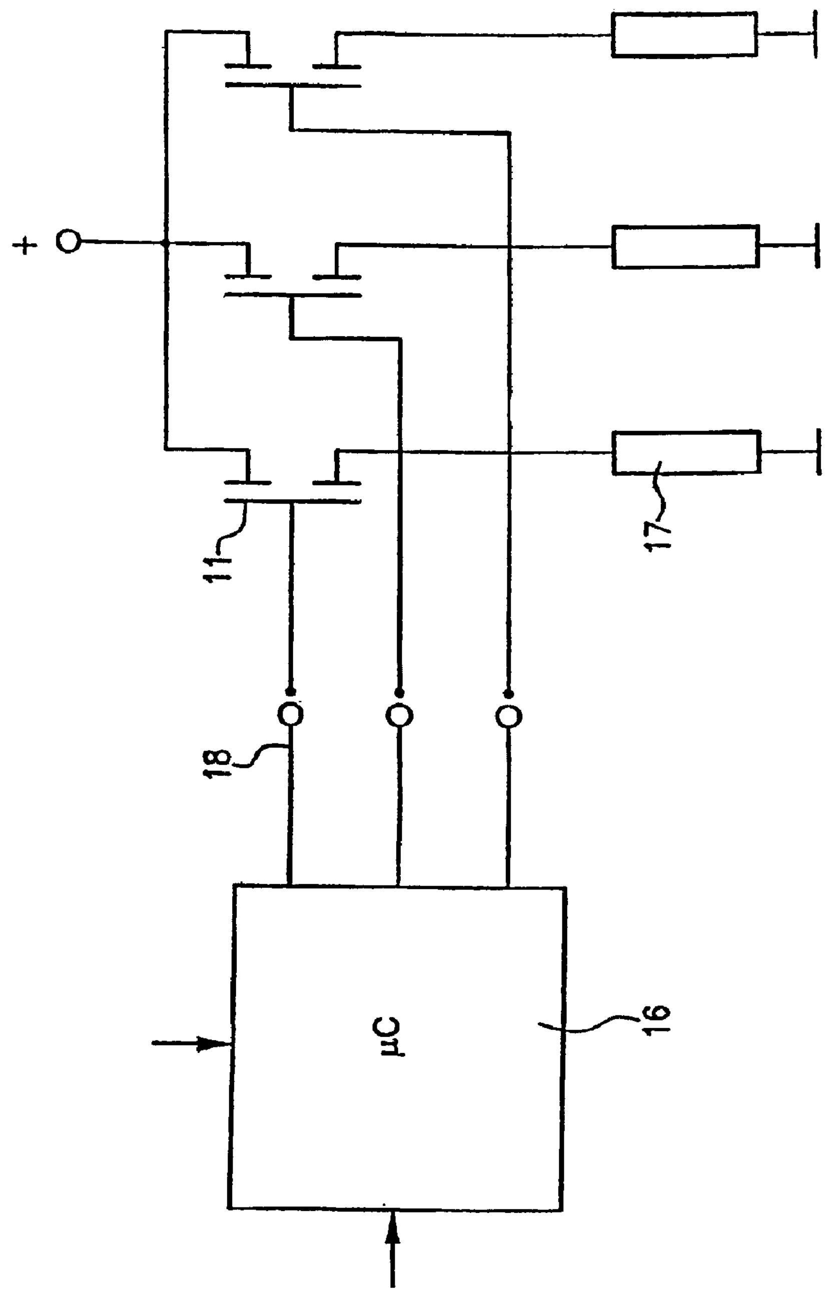
FIG. 7 shows the basic circuit of an electric heating device according to the present invention comprising three heating elements.

The basic circuit of an electric heating device used as an auxiliary heating according to the present invention is shown in FIG. 7. A control unit 16, preferably a computing unit or a microcomputer, controls the heating power of a plurality of electric heating resistors 17. The high currents which are required for achieving a total heating power in the range between 1,000 and 2,000 watts are supplied to the electric heating resistors 17 via power semiconductors 11, especially power transistors. The control device 16 determines the amount of current conducted by the transistors 11 to the resistors 17, said amount of current being determined in dependence upon the control method used and predetermined set values. For this purpose, the computing unit 16 is connected via lines 18 to each of the power transistors 11 separately.

The total heating power produced by the heating resistors is controlled by the computing unit 16 in dependence upon the heating power desired. Also the maximum generator power which is available in a motor vehicle can additionally be taken into account for the purpose of control.

The prior art discloses various power control concepts in the case of which e.g. several independent heating elements are controlled uniformly or controlled sequentially, depending on the desired total heating power. According to the present invention, each heating resistor contributes to the total heating power a heating power contribution having the same time average. For this purpose, the allocation of the control signals ("channels"), produced by the control device 16, to the individual heating elements is varied, especially rotated or permuted, at predetermined time intervals. Heating irregularities will thus be distributed over the whole heating block and zones of non-uniform heating in the air current to be heated will be avoided.

The time intervals are preferably chosen such that, utilizing the thermal inertia of the heating elements, homogeneous heating will be effected.

Making use of a pulse width modulation, the time interval, i.e. the rotation period ($T_R$), corresponds to an integer multiple k of the PWM period $T_{PWM}$. The number of edges produced in this case depends on the demanded heating power, i.e. it especially depends on whether the on/off switching state of a heating element is changed by the change in allocation. Since the number of edges determines the magnitude of the power loss produced, the following equation holds true for the maximum number of edges produced when a single clocked channel is used for the "fine adjustment" of the heating power and when the respective remaining channels are either switched on or off:

$$P_{Edge} = \left[\frac{W_{Rising\ Edge}}{T_{PWM}} + \frac{W_{Falling\ Edge}}{T_{PWM}}\right] \cdot \frac{k+1}{k} \tag{3}$$

If the time interval, i.e. the rotation or permutation period, is chosen very large (i.e. kΠ∞), equation (3) will become equal to equation (2).

Figure 8:
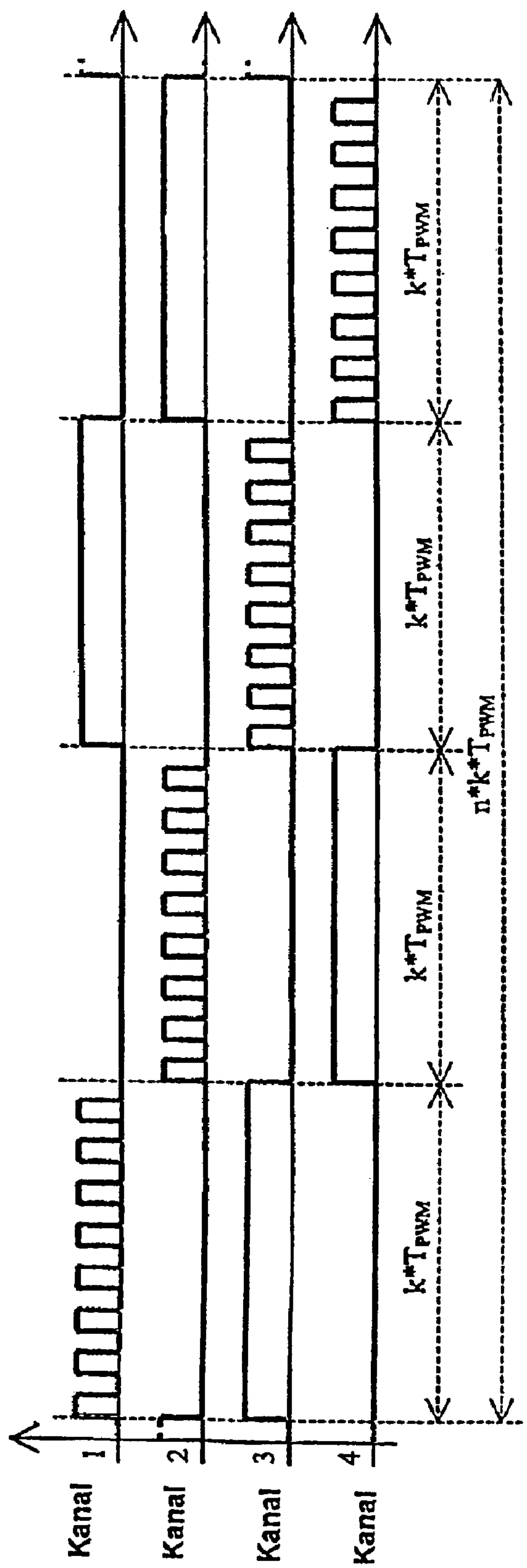
FIG. 8 shows an example of a rotating control of the heating elements of an electric heating device.

FIG. 8 shows an example of a rotating control of the heating elements with four "control channels". The control channels are allocated to the heating elements 17 in accordance with a predetermined rotation scheme. The period duration $T_R$ is chosen such that it is equal to eight times the period duration of a PWM period $T_{PWM}$.

When k has a value of 8 for the ratio of the control rotation time interval to the PWM period, an additional edge loss of 12.5% is produced in comparison with the known method with a clocked channel and without rotation (equation 2). In comparison with the method in the case of which all channels are clocked uniformly (equation 1), a reduction of the edge losses of 71.9% is, however, achieved according to the present example.

I claim:

1. An electric heating device used as an auxiliary heating for motor vehicles comprising:

a plurality of heating elements, which are combined so as to form a heating block, wherein each of said heating elements is controlled separately to heat a particular portion of a total air flow to be heated, the remaining portion of the total air flow being heated only by the remaining heating element; and a control device which controls the heating power of each of the heating elements, the heating power for each of said heating elements being separately adjustable, wherein the control changes an allocation of the heating power to each of the heating elements at predetermined time intervals.

2. An electric heating device according to claim 1, wherein the change of allocation represents a permutation or a rotation of the allocations of the respective separately adjusted heating powers to the individual heating elements.

3. An electric heating device according to claim 1, wherein the control device controls at least one of the heating elements through switching over between a maximum heating power and zero power.

4. An electric heating device according to claim 1, wherein the control device controls at least one of the heating elements via a substantially continuously adjustable heating power.

5. An electric heating device according to claim 1, wherein the control device controls one of the heating elements via a continuously adjustable heating power and all the other heating elements through switching over between the maximum heating power and zero power.

6. An electric heating device according to claim 4, wherein the control device controls the at least one heating element, whose heating power is continuously adjustable, via a pulse width modulation.

7. An electric heating device according to claim 5, wherein the control device controls the one heating element, whose heating power is continuously adjustable, via a pulse width modulation.

8. An electric heating device according to claim 7, wherein the predetermined time intervals represent an integer multiple of a period of the pulse width modulation.

9. An electric heating device according to claim 8, wherein the heating device comprises a total of four separately controllable heating elements and the predetermined time intervals are equal to eight times the period of the pulse width modulation.

10. A method of controlling an electric heating device, used especially as an auxiliary heater for motor vehicles, the heating device comprising a plurality of heating elements combined so as to form a heating block, each of said heating elements being adapted to be controlled separately, controlling the heating power of each of the heating elements separately so that each of said heating elements heats only a portion of the total air flow to be heated, the remainder of the total air flow being healed by the remaining heating elements; and changing the allocation of a heating power to each of the heating elements at predetermined time intervals.

11. A method according to claim 10, wherein the step of changing the allocation of a heating power comprises permuting or rotating the allocations of the respective separately adjusted heating powers to the individual heating elements.

12. A method according to claim 10, wherein one of the heating elements is controlled through switching over between the maximum heating power and zero power.

13. A method according to claim 10, wherein at least one of the heating elements is controlled via a substantially continuously adjustable heating power.

14. A method according to claim 10, wherein one of the heating elements is controlled via a continuously adjustable heating power and that all the other heating elements are controlled through switching over between the maximum heating power and zero power.

15. A method according to claim 13, wherein the at least one heating element whose heating power is continuously adjustable is controlled via a pulse width modulation.

16. A method according to claim 14, wherein the at least one heating element whose heating power is continuously adjustable is controlled via a pulse width modulation.

17. A method according to claim 16, wherein predetermined time intervals represent an integer multiple of a period of a pulse width modulation.

18. A motor vehicle auxiliary electric heating device comprising:

a plurality of separately controllable heating elements which are connected to one another so as to form a heating block, wherein each of said heating elements is adapted to be controlled separately to heat a particular portion of a total air flow to be heated, the remaining portion of the total air flow being heated only by the remaining heating elements; and a control device for controlling the heating elements, the heating power for each of said heating elements being separately adjustable, wherein the control device is configured such that, when control of the individual heating elements is effected, an allocation of the respective separately adjustable heating powers to the individual heating elements is changeable at predetermined time intervals.

19. An electric heating device according to claim 18, wherein the change of allocation represents a permutation or a rotation of the allocations of the respective separately adjusted heating powers to the individual heating elements.

20. An electric heating device according to claim 18, wherein the control device is configured to control at least one of the heating elements through switching over between a maximum heating power and zero power.

21. An electric heating device according to claim 18, wherein the control device is configured to control at least one of the heating elements via a substantially continuously adjustable heating power.

22. An electric heating device according to claim 18, wherein the control device is configured to control one of the heating elements via a continuously adjustable heating power and all the other heating elements through switching over between a maximum heating power and zero power.

23. An electric heating device according to claim 21, wherein the control device is configured to control the at least one heating element, whose heating power is continuously adjustable, via a pulse width modulation.

24. An electric heating device according to claim 22, wherein the control device is configured to control the one heating element, whose heating power is continuously adjustable, via a pulse width modulation.

25. An electric heating device according to claim 24, wherein the predetermined time intervals represent an integer multiple of a period of the pulse width modulation.

26. An electric heating device according to claim 25, wherein the heating device comprises a total of four separately controllable heating elements and the predetermined time intervals are equal to eight times the period of the pulse width modulation.

27. A method of controlling a motor vehicle auxiliary electric heating device, the heating device comprising a plurality of separately controllable heating elements which are interconnected so as to form a heating block, the method comprising:

adjusting the heating power for each of said heating elements separately so that each of said heating elements heat only a portion of the total air flow to be heated, the remainder of the total air flow being heated by the remaining heating elements, and changing the allocation of the respective separately adjusted heating powers to the individual heating elements at predetermined time intervals.

28. A method according to claim 27, wherein the change of allocation represents a permutation or a rotation of the allocations of the respective separately adjusted heating powers to the individual heating elements.

29. A method according to claim 27, further comprising controlling one of the heating elements through switching over between the maximum heating power and zero power.

30. A method according to claim 27, further comprising controlling at least one of the heating elements via operation of a substantially continuously adjustable heating power.

31. A method according to claim 27, further comprising controlling one of the heating elements via a continuously adjustable heating power and controlling all the other heating elements through switching over between a maximum heating power and zero power.

32. A method according to claim 30, wherein the step of controlling the at least one heating element comprises continuously adjusting the heating power of the at least one heating element via a pulse width modulation.

33. A method according to claim 31, wherein the step of controlling the one heating element comprises continuously adjusting the heating power of the one heating element via a pulse width modulation.

34. A method according to claim 33, wherein the predetermined time intervals represent an integer multiple of a period of the pulse width modulation.

* * * * *